United States Patent [19]

Romano

[11] Patent Number: 4,945,785
[45] Date of Patent: Aug. 7, 1990

[54] DEVICE FOR A BICYCLE INCLUDING A CONTROL LEVER PIVOTED ON AN ADJUSTABLE SUPPORT

[75] Inventor: Antonio Romano, Padova, Italy

[73] Assignee: Campagnolo S.r.l., Vicenza, Italy

[21] Appl. No.: 346,500

[22] Filed: May 2, 1989

[30] Foreign Application Priority Data

May 2, 1988 [IT] Italy ............................ 67401 A/88

[51] Int. Cl.$^5$ .................... G05G 11/00; F16C 1/10
[52] U.S. Cl. ........................... 74/502.2; 74/483; 74/526
[58] Field of Search ............. 74/488, 489, 502.2, 74/526, 527, 551.9, 558.5; 188/2 D

[56] References Cited

U.S. PATENT DOCUMENTS

| 4,222,285 | 9/1980 | Kine | 74/489 X |
| 4,307,625 | 12/1981 | Lauzier | 74/489 |
| 4,425,819 | 1/1984 | Shimano | 74/526 X |
| 4,459,871 | 7/1984 | Shimano | 74/551.9 X |
| 4,484,490 | 11/1984 | Shimano | 74/489 |

FOREIGN PATENT DOCUMENTS 459190  8/1950  Italy ............................ 74/502.2

Primary Examiner—Vinh T. Luong
Attorney, Agent, or Firm—Sughrue, Mion, Zinn, Macpeak & Seas

[57] ABSTRACT

A control device adapted to be mounted on a handlebar of a bicycle includes a support body having a first element adapted to be rigidly connected to the handlebar and a second element pivotally mounted on the first element for rotation about an axis relative to the first element. A projection on the second element extends radially with respect to the axis into a recess in the first element and a pair of screw members engage the projection on opposite sides thereof to adjust the position of the second element relative to the first element and to secure the second element in the adjusted position. A control lever is pivoted on the support body and is adapted to operate a control cable.

4 Claims, 1 Drawing Sheet

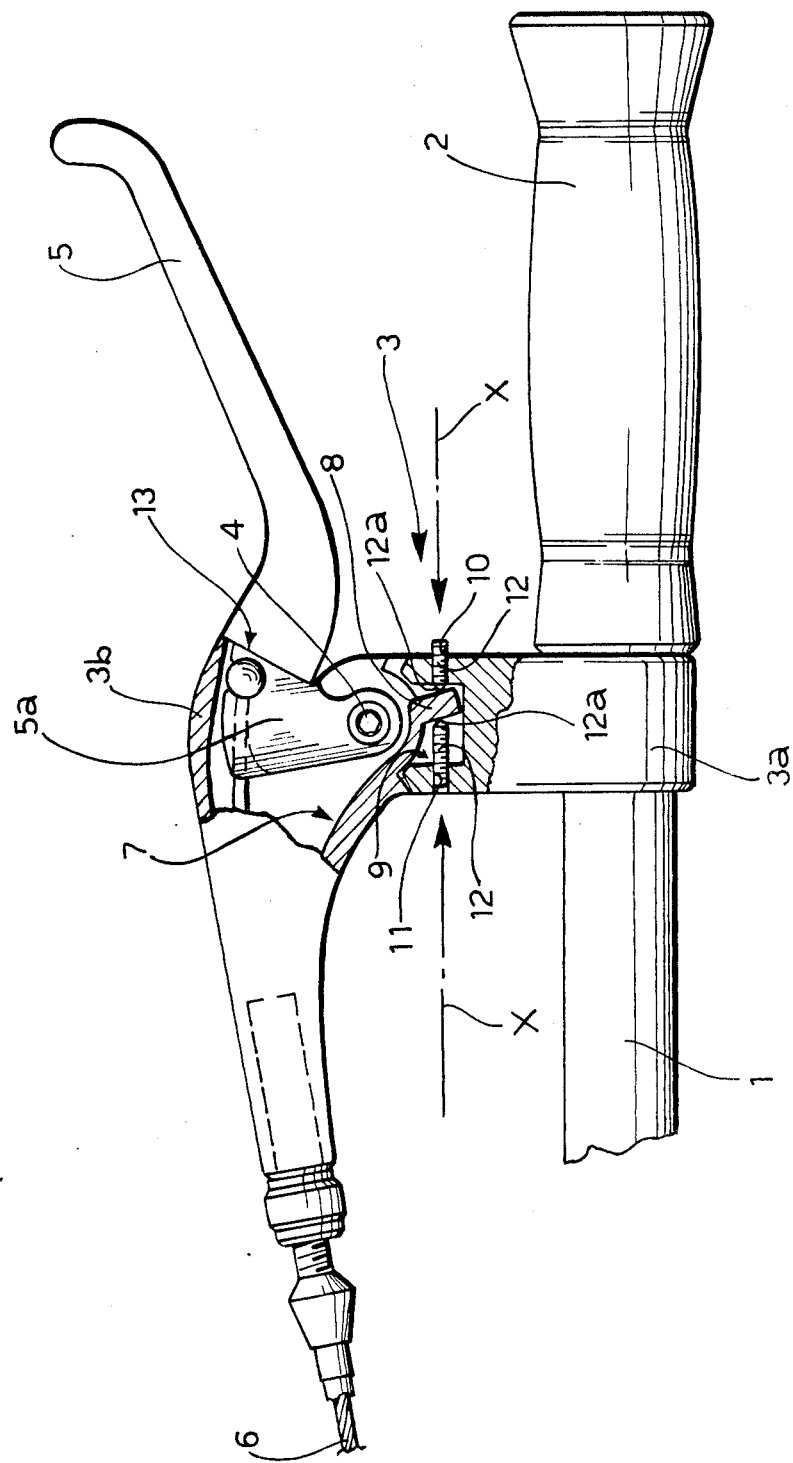

4,945,785

DEVICE FOR A BICYCLE INCLUDING A CONTROL LEVER PIVOTED ON A ADJUSTABLE SUPPORT

BACKGROUND OF THE INVENTION

The present invention relates to a support for control levers adapted to be connected to the handlebars of cycles, motorcycles or the like, comprising a body to which the lever is articulated.

The distance of the levers from the handlebars, in their rest configuration, is established at the design stage on the basis of the average dimensions of the users' hands. However, the optimal distance between the lever and the handlebars varies from user to user, so that the design selection often bears little relationship to the cyclist's individual requirements.

SUMMARY OF THE INVENTION

The object of the present invention is to produce a control lever support which enables this problem to be overcome, whatever the size of the hand and/or the requirements of the user.

According to the invention, this object is achieved by virtue of the fact that the body of the support comprises a first element connected to the handlebars and a second element which is articulated to the first and to which the lever is articulated, adjustable abutment means being interposed between the first and second elements for varying the angular position of the second element relative to the first.

By virtue of these characteristics, the user can operate on the adjustable abutment means to vary the distance between the handlebars and the control lever to adapt it to his own requirements.

BRIEF DESCRIPTION OF THE DRAWINGS

Further characteristics and advantages of the present invention will become clear from the detailed description which follows, purely by way of non-limiting example, with reference to the appended drawing which shows, in partial section, a lever articulated to a support according to the invention.

DETAILED DESCRIPTION OF THE INVENTION

With reference to the drawing, one end of the handlebars of a mountain bicycle, of the type in which the control levers of the front and rear brakes are arranged substantially in the same horizontal plane of the handlebars, is indicated 1.

A grip 2 is mounted on each end of the handlebars 1 and a support 3, to which a lever 5 is articulated at 4, for example, for the operation of a flexible brake cable 6, is also connected to each end of the handlebars in known manner.

The support 3 of the lever 5 is constituted by a first element 3a which is firmly connected to the handlebars 1 and by a second element 3b which is articulated at 4 to the first element 3a, coaxially with the axis of articulation of the lever 5. The second element 3b of the support 3 has a recess 7 in which one end 5a of the control lever 5 is mounted, and is also provided with a radial appendage 8 which extends into a corresponding seat 9 in the first element 3a of the support 3. Grub screws 12 with facing ends 12a in abutment with opposite faces of the radial appendage 8 are screwed into respective threaded holes 10 and 11 in the first element 3a and are arranged along a common axis X—X perpendicular to the axis 4 of articulation of the lever 5 to the first element 3a.

In order to vary the relative distance between the lever 5 and the grip 2 on the handlebars 1, the user acts on the grub screws 12, for example, by means of a screwdriver, to vary the angular position of the second element 3b of the lever support 3 relative to the first element 3a. The lever 5, which abuts the body 3 at 13 in its rest configuration, follows the rotation of the second element 3b about the axis 4, enabling the lever 5 to be moved towards or away from the handlebars.

Naturally, it is understood that, the principle of the invention remaining the same, the forms of embodiment and details of construction may be varied widely with respect to those described and illustrated, without thereby departing from the scope of the present invention.

I claim:

1. A control device adapted to be mounted on a handlebar of a bicycle comprising a support body having a control lever pivoted thereon and against which a sheath of a control wire adapted to be operated by the control lever abuts,
    said support body including a first element adapted to be connected to the handlebar and a second element pivotally mounted on said first element for rotation about an axis,
    said control lever being pivoted on said second element and adjustable abutment means interposed between said first and second elements for varying the angular position of the second element relative to the first and for making the second element fast with the first element.

2. A control device as set forth in claim 1, wherein said control lever is pivoted on said second element for rotation about said axis about which said second element pivots relative to said first element.

3. A control device as set forth in claim 1, wherein said adjustable abutment means comprises an appendage on said second element which extends radially with respect to said axis, a seat in said first element in which said appendage is movable upon pivotable movement of said second element relative to said first element, and screw-adjustment members carried by said first element and adapted to abut the appendage of said second element to make it fast with said first element.

4. A control device as set forth in claim 3, wherein said screw-adjustment members are comprised of two grub screws screwed into said first element along a common axis substantially perpendicular to said axis and having facing ends in abutment with opposite faces of said radial appendage of said second element.

* * * * *